United States Patent [19]
Hornsby, Jr.

[11] 4,032,687
[45] June 28, 1977

[54] TRANSFERABLE COLOR CHANGEABLE APPLIQUE

[75] Inventor: James R. Hornsby, Jr., Orlando, Fla.

[73] Assignee: Funstuf, Inc., Orlando, Fla.

[22] Filed: Dec. 12, 1975

[21] Appl. No.: 640,184

[52] U.S. Cl. .................... 428/1; 40/2 R; 428/40; 428/192; 428/194

[51] Int. Cl.² .................................. C09K 3/34

[58] Field of Search ............... 428/1, 40, 192, 194; 40/2 R

[56] References Cited
UNITED STATES PATENTS

| | | | |
|---|---|---|---|
| 2,269,870 | 1/1942 | Carter | 40/2 |
| 2,940,196 | 6/1960 | Schor | 40/2 |
| 3,661,142 | 5/1972 | Flam | 428/1 |

Primary Examiner—Marion E. McCamish
Attorney, Agent, or Firm—Roylance, Abrams, Berdo & Kaul

[57] ABSTRACT

An applique is attachable by pressure sensitive adhesive or the like to a supporting surface. The applique includes a base sheet, a layer of color changeable liquid crystalline material disposed upon the base sheet, and a transparent covering layer overlying the liquid crystalline layer. The applique is removable for use as a novelty or a premium item and is color changeable by application of heat, such as from the user's fingers, to the applique since such heat causes a color change in the liquid crystalline layer.

1 Claim, 5 Drawing Figures

TRANSFERABLE COLOR CHANGEABLE APPLIQUE

This invention relates to an applique which is usable as a novelty or premium item and more particularly it relates to a transferable color changeable applique incorporating a layer of liquid crystalline material which is color changeable in response to the application of heat.

There are various known forms of novelty and premium items which are adaptable for a variety of different uses. For example, in connection with sporting events, various forms of insignias are available showing a particular team's name and other identifying indicia. Often, these items are sold in the form of buttons, decals, T-shirts and sew-on or iron-on patches. It is also quite common at sporting events to use various items such as programs, drinking cups, food containers and other such items where a particular team name or insignia is imprinted by conventional printing techniques upon the paper from which such items are fabricated.

The present invention is addressed to the same general area as are such known forms of indicia and novelty and premium devices, but additionally, it incorporates certain features not heretofore available. The primary feature provided in the present invention and not heretofore available in known items of this type is the provision of a color changeable means whereby application of heat from the user's fingers, or from any other heat source, causes a color change in the novelty item, thus presenting a unique and attractive and interesting item which would be particularly useful for children. Additionally, the present invention is adaptable in that it is directed to an item which can be offered for sale by itself, much in the manner of a decal or cloth patch, or alternatively, can be provided in a form which is removably attached to an item which is otherwise purchased, such as, for example, a drinking cup, a food container, a program, or the like. If, for example, the applique of the present invention is provided on a drinking cup or the lid for a drinking cup, then the user is able to consume the contents of the cup and thereafter remove the applique to be able to use the same separate and apart from the cup on which it was initially provided.

With the foregoing in mind, it is an object of the present invention to provide a unique and novel transferable color changeable applique.

Another object of the present invention is to provide an applique which can be sold as a separate item or which can be removably attached to an otherwise provided item and transferred therefrom by simple manual manipulation.

Another object of the present invention is to provide a unique and attractive novelty item having color changeable characteristics wherein color changes are provided in response to temperature changes.

Other objects, advantages and salient features of the present invention will become apparent from the following detailed description, which, taken in conjunction with the annexed drawings, discloses a preferred embodiment thereof.

The foregoing objects are attained by providing an applique in the form of a laminate having a base sheet which is preferably adhesively backed by means of a pressure sensitive adhesive. If the applique is to be sold separately, the pressure sensitive adhesive can be covered by a backing layer which is readily removable. If the applique is provided in the form where it is already attached to some other object, such as a food or drink container, then the applique is removable by peeling the same away from such item to remove the bonding of the pressure sensitive adhesive against the underlying item.

The base sheet is covered by a layer of liquid crystalline material of the type which exhibits color changes in response to temperature variations. A transparent layer in the form of a film overlies and hence protects the liquid crystalline layer. Printed indicia can be provided on the base sheet itself or on the film which overlies the liquid crystalline material.

Referring now to the drawings which form a part of this original disclosure:

Figure 1:
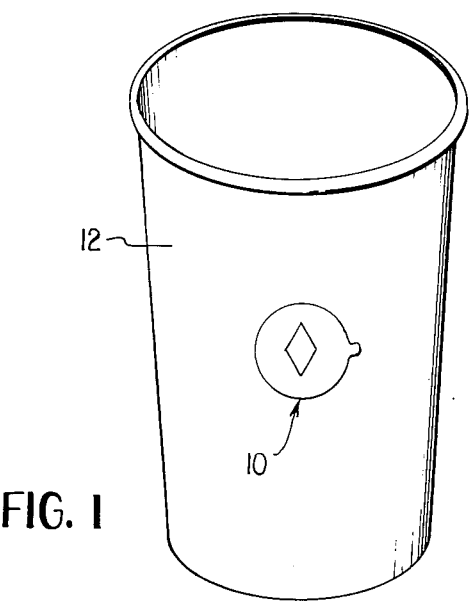
FIG. 1 is a prospective view of a container having the applique of the present invention applied thereto.

Referring now to the drawings in further detail, the applique of the present invention is generally designated 10. It is shown in FIG. 1 applied to the side of a drink container 12 in the form of a paper or plastic cup such as those commonly used to provide liquid refreshments at sporting events and other public entertainment events. If the applique 10 is provided in the form shown in FIG. 1, it is provided as a novelty or premium item which is removable by the user after the drink is consumed. As such, the applique 10 can carry any type of sports insignia or name, printed advertising indicia or any other form of indicia. In the event that an assembly such as that shown in FIG. 1 is provided, the user can consume the drink and can thereafter remove the applique in a manner to be discussed more fully hereinafter. In such event, the user would not have actually purchased the applique 10, but instead, it would have been provided to him or her as a novelty or premium item.

Figure 3:
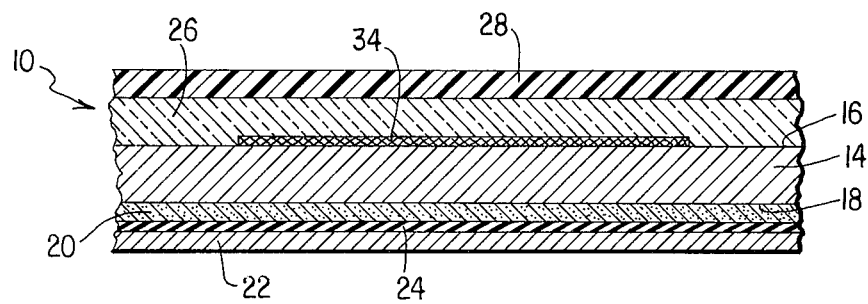
FIG. 3 is an enlarged fragmentary sectional view of an applique in accordance with the present invention.

For a fuller understanding of the nature and construction of the applique of the present invention, attention is directed to FIG. 3 hereof. The applique 10 as shown in cross-section in FIG. 3 includes a base sheet 14 having an upper surface 16 and a lower surface 18. An attaching medium 20 is disposed along the lower surface 18 of the base sheet to enable the applique 10 to be removably affixed to a supporting surface. The attaching medium 20 preferably takes the form of a pressure sensitive adhesive material which would ordinarily comprise a highly tackified synthetic polymer with permanent sticky properties, preferably transparent in nature, and of a type which adheres by pressure alone and is more cohesive than ordinary adhesive materials. Typical pressure sensitive adhesive materials are those including a rubbery polymeric compound with suitable compatible resinous tackifiers and dispersed in an appropriate solvent.

If the applique 10 is to be applied directly to a supporting object, such as the cup 12 shown in FIG. 1, then such application is accomplished simply by pressing the applique 10 against the cup 12 at the appropriate place whereupon the applique will be retained in position by the adhesive action of the layer 20. However, if the applique 10 is to be sold as a separate item, then it is necessary to provide a removable backing sheet for the adhesive such as the backing sheet 22 shown in FIG. 3, which backing sheet includes a release agent 24 thereon directed toward the adhesive layer 20. While the base layer 14 can be formed of paper or plastic or any other suitable material, the backing sheet 22 would ordinarily be formed of paper having a suitable release coating 24 supplied thereon. Typical release coatings would be silicones or silicone rubber compositions.

A layer of liquid crystalline material 26 is disposed along the upper surface 16 of the base sheet 14. The nature of the liquid crystalline material 26 is such that it undergoes spectral color changes of an iridescent nature in response to temperature changes. Such materials are often referred to as mesomorphic compounds and they are customarily formed of cholestryl esters, a type of compound having the unique property of scattering light of various colors over a specific short temperature range wherein the colors vary in accordance with the temperature within that range. Moreover, the color change is reversible so that if the colors change from red through the spectrum to blue upon heating of the liquid crystal material, the reverse colors will appear as cooling occurs.

The specific compound from which the liquid crystal material 20 is formed can be of the type disclosed in U.S. Pat. No. 3,441,513, issued to W. E. Woodmansee on Apr. 29, 1969 or U.S. Pat. No. 3,620,889, issued to D. H. Baltzer on Nov. 16, 1971, the disclosures of which are hereby incorporated by reference. Moreover, the liquid crystal material 26 can be of the type which is encapsulated as disclosed in U.S. Pat. No. 3,585,381 issued to T. L. Hodson et al. on June 15, 1971, or U.S. Pat. No. 3,732,119, issued to D. Churchill et al. on May 8, 1973, or U.S. Pat. No. 3,795,529, issued to J. V. Cartmell et al. on Mar. 5, 1974, the disclosures of all such patents being incorporated herein by reference.

In order to prevent the liquid crystalline layer 26 from being contacted by the user's fingers or subjected to damage or the degrading effects of dirt, moisture or the like, a protective layer 28 is provided in overlying relationship to the liquid crystalline layer 26. The protective layer 28 is transparent to permit visual observation of the color changes in the liquid crystal layer 26 and preferably takes the form of a transparent plastic film such as Mylar.

Figure 4:
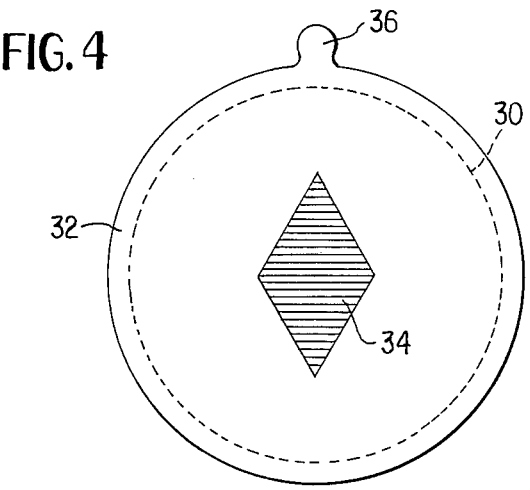
FIGS. 4 and 5 are plan views of the applique of the present invention exhibiting different color characteristics in response to temperature changes.
Figure 5:
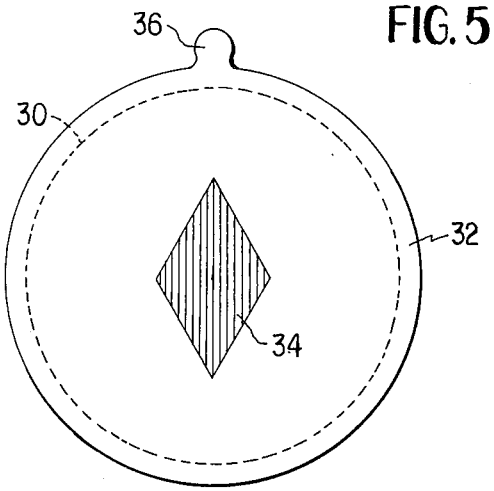

In order to attach the transparent layer 28 in such a manner as to fully envelop and protect the liquid crystalline layer 26, it is preferred that the liquid crystalline layer terminate slightly inward from the peripheral edges of the base sheet 14. This is shown in FIGS. 4 and 5 wherein the dashed line 30 indicates the terminus of the liquid crystalline material and the marginal portion 32 represents that area of the base sheet which extends beyond the liquid crystalline material. In this marginal area, the transparent film 28 is adhered to the base sheet by any suitable attaching adhesive means or by direct bonding or cohesion.

The applique of the present invention includes indicia means 34 which are disposed adjacent to the liquid crystalline layer 26. As such, the indicia means 34 can be imprinted upon the upper surface 16 of the base sheet 14, or alternatively, can be imprinted upon the overlying transparent layer 28. In either event, the indicia means 34 can take the form of a printed advertising message, an insignia or other forms of printed or artistic matter or any combination thereof. For ease of illustration, the indicia 34 in the subject application is shown in the form of a diamond shape.

Figure 2:
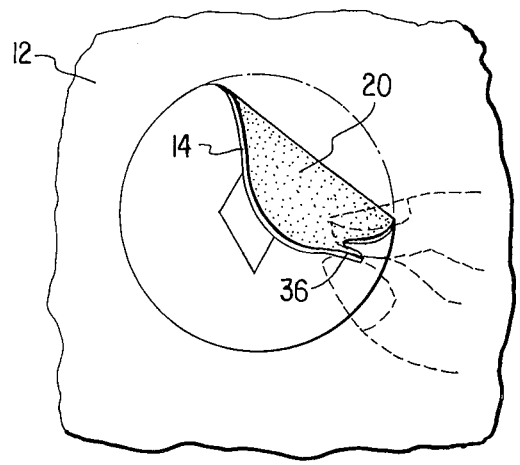
FIG. 2 is a fragmentary elevational view showing the manner in which the applique of the present invention can be removed from an underlying supporting surface.

A finger engageable tab member 36 is provided along one edge of the applique, preferably as an integral extension of the base sheet 14, but the tab member 36 does not have any adhesive 20 applied thereto. The purpose for the tab member is to provide a finger engageable portion which can be used to peel the applique away from an underlying supporting item, such as is illustrated in FIG. 2 wherein the applique 10 is being peeled away from the supporting cup 12 by means of digital grasping of the tab 36 to apply a peeling action to the applique 10.

It is preferred that the entire applique 10 be of a generally thin and flexible nature which is readily accomplished by fabricating the base sheet 10, the attaching medium 20, the liquid crystalline layer 26 and the transparent top layer 28, as well as the backing sheet 22 if used, of a thin flexible material. Since the color change in the liquid crystalline material is effected by means of temperature variation in the liquid crystalline layer, such temperature variations can occur simply by rubbing the user's finger across the transparent layer 28 so that the heat from the user's finger is transmitted to the transparent layer 26. In FIGS. 4 and 5, the indicia 34 is shown in one figure lined for blue and in the other figure lined for red. These color changes make the applique of the present invention a unique and attractive item which will be of great interest and enjoyment to persons of all ages but particularly to children.

As an example of the applications of the applique of the present invention, consider the situation where the indicia 34 represents the name and insignia of a particular sports team. The management of that team could have such appliques prepared and could offer them for sale at a nominal price in the form of thin flexible sheets having the backing layer 22 attached thereto. Alternatively, if the management wanted to use the appliques as a novelty or premium item, they could simply attach the same to the soft drink cups, popcorn boxes, programs or other items to be offered for sale at the sporting events. In such event, the purchaser of a soft drink would receive a container such as the container 12 illustrated in FIG. 1 hereof. After he or she finished consuming the contents of the cup, the applique could be peeled away in the manner illustrated in FIG. 2. It could then be attached to any other desired supporting surface, such as a child's notebook, an automobile bumper, or the like.

The particular size or configuration of the applique of the present invention is without limit and it should be understood that the invention is not limited to the circular shape which is shown in the drawings for illustrative purposes only. Moreover, various other changes and modifications obvious to those skilled in the art may be made without departing from the spirit and scope of the invention as defined in the appended claims.

What is claimed is:

1. A transferable color changeable applique comprising:
   a base sheet having an upper and a lower surface;
   an adhesive layer disposed along said lower surface of said base sheet to enable said applique to be removably affixed to a supporting surface;

a layer of liquid crystalline material disposed along said upper surface of said base sheet;

said liquid crystalline material having characteristics of selective light scattering to exhibit color changes in response to temperature changes; and indicia means disposed adjacent to and in contact with said liquid crystalline layer and surrounded by said liquid crystalline material;

a transparent layer disposed upon said liquid crystalline material to allow visual observation of the color changes in said liquid crystalline layer; and a removable backing sheet removably attached to said adhesive layer.

* * * * *